(12) United States Patent
Rombold

(10) Patent No.: US 8,002,077 B2
(45) Date of Patent: Aug. 23, 2011

(54) ELECTRICAL POWER STEERING WITH AIR DISCHARGE SYSTEM

(75) Inventor: Manfred Rombold, Winnenden-Höfen (DE)

(73) Assignee: ThyssenKrupp Presta AG, Eschen (LI)

( * ) Notice: Subject to any disclaimer, the term of this patent is extended or adjusted under 35 U.S.C. 154(b) by 34 days.

(21) Appl. No.: 12/499,410

(22) Filed: Jul. 8, 2009

(65) Prior Publication Data

US 2010/0012419 A1    Jan. 21, 2010

(30) Foreign Application Priority Data

Jul. 18, 2008 (DE) .......................... 10 2008 033 879

(51) Int. Cl.
*B62D 5/04* (2006.01)
(52) U.S. Cl. .......................... 180/444; 180/422; 180/428
(58) Field of Classification Search .................. 180/444, 180/417, 422, 419, 427, 441, 442, 428
See application file for complete search history.

(56) References Cited

U.S. PATENT DOCUMENTS

| | | | | |
|---|---|---|---|---|
| 6,267,395 B1* | 7/2001 | Howard | ..................... | 280/89.11 |
| 6,273,210 B1* | 8/2001 | Saito et al. | ..................... | 180/444 |
| 6,595,532 B2* | 7/2003 | Tanaka | ..................... | 280/93.515 |
| 2006/0219467 A1* | 10/2006 | Damore et al. | ............... | 180/428 |

FOREIGN PATENT DOCUMENTS

DE            10207466 A1       7/2003
* cited by examiner

*Primary Examiner* — Paul N Dickson
*Assistant Examiner* — Tashiana Adams
(74) *Attorney, Agent, or Firm* — Connolly Bove Lodge & Hutz LLP

(57) ABSTRACT

The invention relates to an electrical power steering system for a motor vehicle with a steering housing, in which a gear system is arranged, wherein a bar mounted such as to be displaceable longitudinally in the housing is a gear element for actuating steerable wheels, and wherein the steering housing is closed off by at least one folding bellows element, which is secured on one side to the steering housing and on the other side to the bar. Rapid pressure compensation in the event of temperature change is guaranteed, because a hose is connected at one end such as to communicate with the interior volumes of the steering housing, and when in operation is secured at a second free end above the steering housing.

10 Claims, 3 Drawing Sheets

ELECTRICAL POWER STEERING WITH AIR DISCHARGE SYSTEM

CROSS-REFERENCE TO RELATED APPLICATIONS

Figure 1:
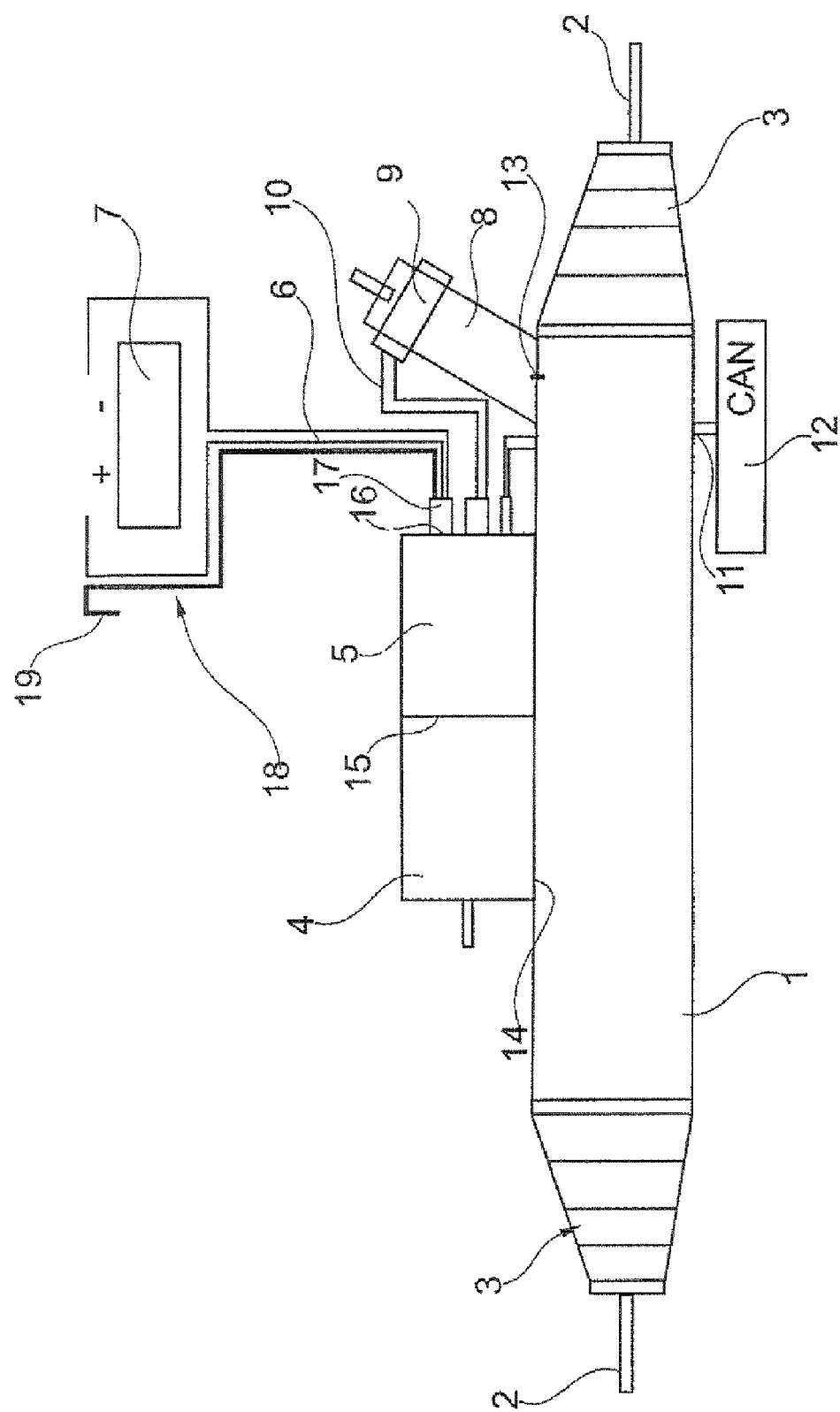

This application claims priority from German Application No. 102008033879.6-21, filed Jul. 18, 2008, the entire contents of which are incorporated herein by reference.

The present invention relates to a power steering system.

Electrical power steering systems, in contrast to hydraulic steering systems, have a relatively large internal air volume, which is brought about by the gear and drive systems. Power steering systems are closed off to the outside in the area of the movable bearing-mounted toothed bar by folding bellows elements in order to prevent the penetration of water and foreign bodies into the power steering system. In the event of temperature changes, the volume of the air contained in the power steering system also changes. As the folding bellows element heats up, it expands, and contracts as it cools. If this happens to an excessive degree, the risk occurs that the bellows element gets damaged. The housing must be ventilated as a consequence.

According to the prior art, gas-permeable and fluid-tight membranes are used for the ventilation, which are formed into the folding bellows elements. Porous filter elements are also used, which are arranged in holes in the steering housing. These air introduction devices are intended to allow air to pass through but keep back water and foreign bodies, since they are arranged on the steering housing, i.e. in the area of the motor vehicle affected by spray water, under certain conditions, such as shock cooling from approx. 100° C. to 5° C. Such a process can occur in a motor vehicle in operation, for example, when driving through water.

From DE 102 07 466 A1, a power steering system is known, in which a pressure-compensation element is arranged in the pressure component.

It has been shown that with conventional air introduction and extraction systems, a pressure compensation time of about 10 minutes is required.

It is therefore the object of the present invention to provide a system, which is as economical and reliable as possible, for introducing and extracting air for an electrical power steering system, which allows more rapid pressure compensation.

This object is resolved by a power steering system having the features of Claim 1.

Due to the fact that a hose is connected at one end such as to communicate with the interior volume of the steering housing and when in operation is secured at a second free end above the steering housing, in particular with a continuous free cross-section, laid leading out of the steering housing parallel, at least in sections, to the electrical connecting leads of the power steering system, the exchange of air with the atmosphere can take place rapidly via the free cross-section of the hose. The risk of water being sucked in during the cooling phase if the motor vehicle travels through water is minimized by laying the leads in a cable harness. The free opening of the hose located away from the steering housing can also be guided freely to a point located high up in the motor vehicle.

Such a suitable position is in many motor vehicles the installation location of the battery. Advantageously, the power steering system is completely sealed, except for the air extraction hose, such that even actuation under water will not impair the functional performance.

In order to separate condensation water from the steering system or to prevent atmospheric water being sucked into the steering system it is advantageous if the free end of the hose is provided with a U-shaped design, for example in the manner of a siphon. In the final analysis, the free cross-section of the hose can be provided with a particle filter. The particle filter can in this situation be provided with a particularly low flow resistance, being designed, for example, as a non-woven fleece. Such a particle filter will at least prevent penetration of coarse dirt particles, without the air extraction encountering undesirably high resistance. In contrast to the known filter elements arranged on the steering housing, this is possible because water tightness is not required here.

An embodiment of the present invention is described hereinafter, on the basis of the drawings.

Figure 2:
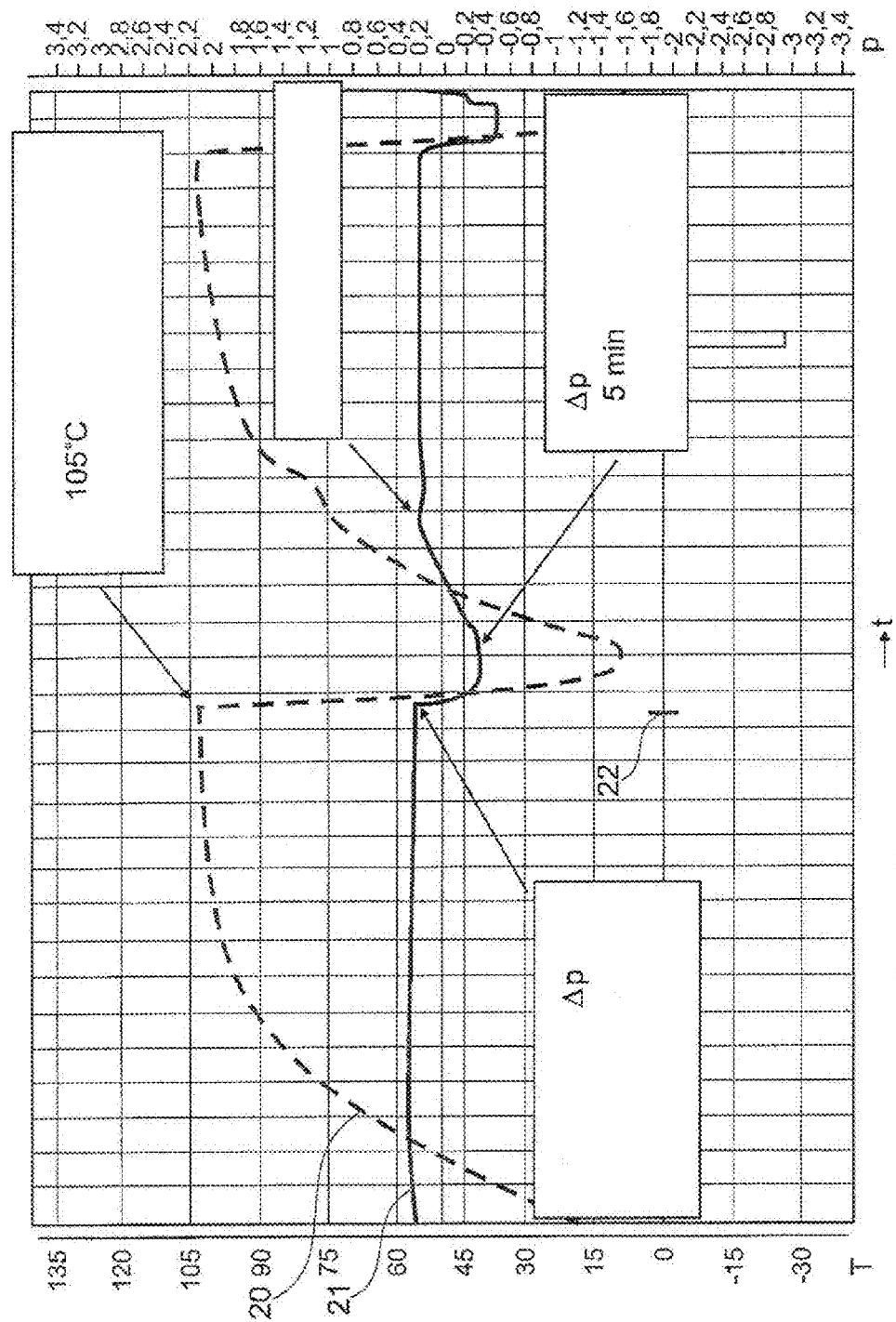
Figure 3:
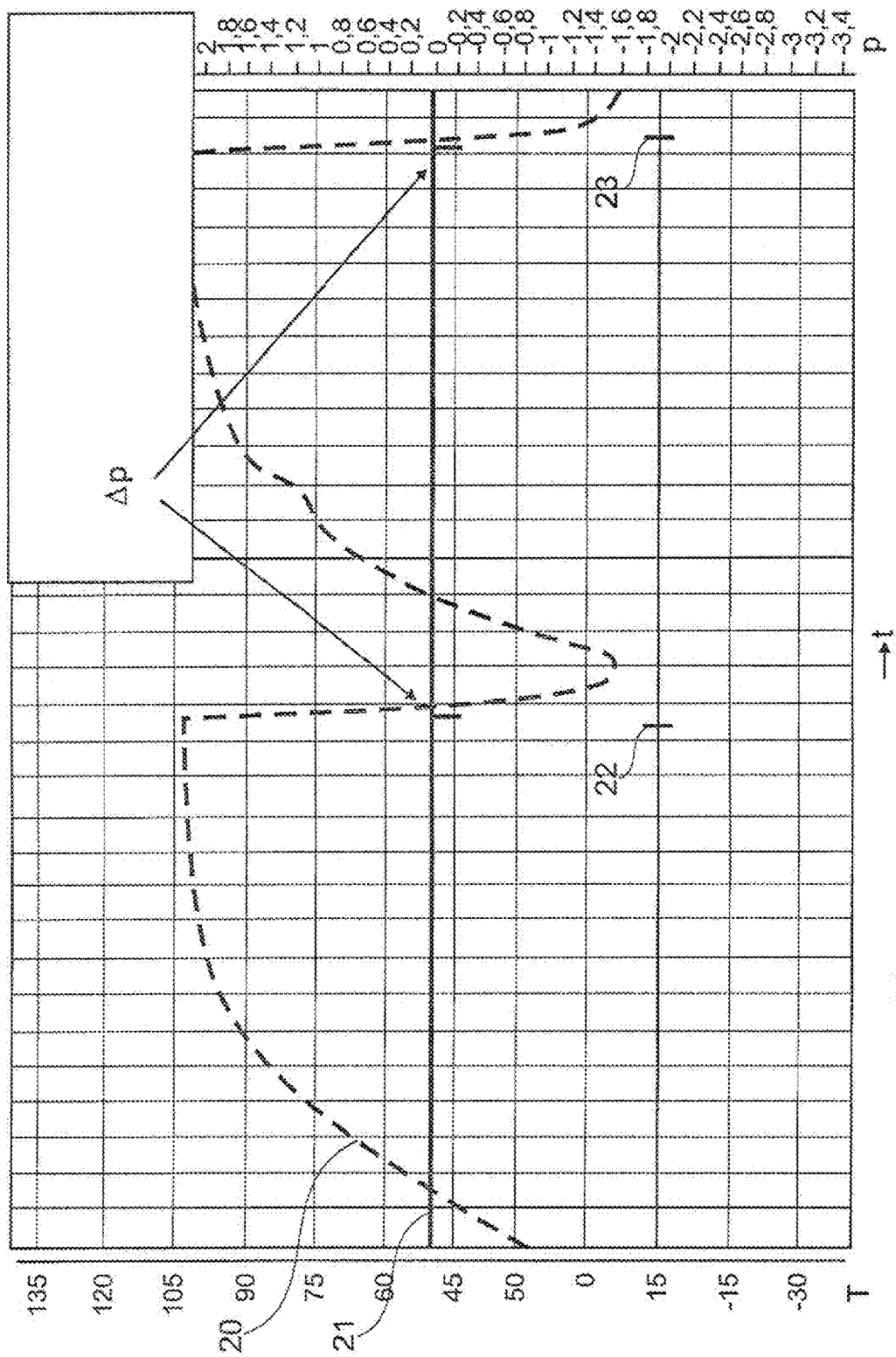

These show:

FIG. 1: An electrical power steering system according to the invention in a diagrammatic representation;

FIG. 2: A diagram illustrating the pressure and temperature curve in a conventional power steering system, with air extraction by way of membranes in the folding bellows element;

FIG. 3: A diagram corresponding to FIG. 2 for a power steering system according to the invention.

FIG. 1 represents in diagrammatic form an electrical power steering system with a steering housing 1. The steering housing is usually made from cast aluminum. Mounted in the steering housing 1 is a toothed bar 2, arranged such as to be displaceable in the longitudinal direction. The sealing between the steering housing 1 and the toothed bar 2 is effected by means of two folding bellows elements 3, which are telescopically extendable. The drive for the electrical power steering is only represented in diagrammatic form. It comprises an electric motor 4, which is actuated by a control unit 5. The control unit 5 is connected via electrical leads 6 to the power supply of a motor vehicle, which is illustrated as a battery 7. The steering housing 1 also carries a steering pinion housing 8, also arranged in which is a torque sensor 9. The torque sensor 9 is likewise connected via leads 10 to the control system 5. Finally, the control system 5 is connected by further leads 11 to a data bus 12.

The steering housing 1, the pinion housing 8 and the motor housing 4 are in each case connected to one another via pressure compensation channels 13 and 14 respectively.

Likewise, a pressure compensation channel 15 is provided between the electric motor 4 and the housing of the control system 5. Finally, a pressure compensation channel 16 is provided, which is arranged between the housing of the control system 5 and a connecting plug 17 for the leads 6. A hose 18 is conducted from the plug 17 parallel to the leads 6 as far as the battery 7. The hose 18 is provided in the vicinity of the battery 7 with a U-shaped free end 19.

By way of the connecting channels 13, 14, 15, and 16, the hose 18 is in communicating connection with the individual volumes of the power steering system. This accordingly allows for pressure compensation between the interior volumes communicating with one another of the steering housing 1, the pinion housing 8, the electric motor 4, the control system 5 and the atmosphere.

FIG. 2 shows in a diagram the temperature curve and the pressure curve in a simulation of an electrical power steering system. The experimental arrangement makes provision for a test housing with similar properties and similar volume to be used like a real electrical power steering system. The test housing is provided with pressure compensation elements of the design type also used in practice. In FIG. 2, the pressure compensation elements are the membranes known from the prior art, made of gas-permeable PTFE film.

Specifically, FIG. 2 shows in the X-axis the time, with the temperature in ° C. entered on the left in the Y-axis. On the right in the Y-axis is the pressure p. A broken line 20 shows the temperature curve of the test housing over time. The unbroken line 21 shows the differential pressure in relation to the atmosphere, likewise as a function of the time, which accrues in the test housing.

The measurement process is carried out in such a way that, in the first instance, the test housing is heated along the line 20 from 5° C. to 105° C. At a point in time 22, the test housing is immersed in water at the temperature 5° C. The pressure falls from equilibrium pressure Δp=0 within a few seconds to an underpressure of about −0.4 bar in relation to atmospheric pressure. This underpressure is made up entirely in the course of about 15 minutes. During this period, the folding bellows element 3 in FIG. 1 would be compressed by the external pressure, such that, during steering movements, the ball joints located inside the individual folding bellows element could possibly damage the bellows element.

FIG. 3 shows the same test procedure as in FIG. 2, but with a test housing which is equipped with the air extraction device according to the invention, using a hose 18. It can be seen that at the point in time 22 of the test sequence, just as at a later point in time 23 in a further measuring cycle, the pressure inside the test housing drops, but only to an underpressure of Δp=0.2 to 0.3 bar. The entire period of time during which underpressure prevails in the test housing can be easily discerned in this representation. The time which is required for the pressure compensation via the hose 18 is well under one minute. The mechanical loading of the housing and the folding bellows element are in practice thereby minimized in practice. In addition, with the power steering system according to the invention, there is less risk than with the prior art that, during the period, in which underpressure prevails, water will be sucked into the steering system. This is due on the one hand to the fact that the duration and the differential pressure with the solution according to the invention are only smaller than with the prior art. And on the other hand, the pressure compensation element is arranged above the steering system and, therefore, even if the vehicle travels through water, it is not exposed directly to the surrounding water. With one specific embodiment of the present invention, provision is made for the plastic hose 18 with an inner diameter of 2.4 mm to be arranged in a cable harness parallel to the electrical leads 6. The cable harness then conducts the hose 18 as well as the leads 6 into the area of the electrical connections, which are arranged in the upper part of the engine chamber of the motor vehicle, protected against spray water. There, the hose 18 terminates at its free end 19, while the electrical leads 6 are connected to the power supply. In this way, the steering system can "breathe" through the hose 18 in the event of temperature changes. The pressure compensation required is achieved rapidly and reliably.

The connection of the hose 18 to the interior of the steering system can be effected, for example, by way of a passage aperture inside the plug connection of the plug 17, such that the hose 18 is taken off for assembly purposes together with the plug 17 and then fitted back on again.

LIST OF REFERENCE NUMERALS

1. Steering housing
2. Toothed bar
3. Folding bellows element
4. Electric motor
5. Control unit
6. Electrical leads
7. Battery
8. Steering pinion housing
9. Torque sensor
10. Leads
11. Leads
12. Data bus
13. Pressure compensation channel
14. Pressure compensation channel
15. Pressure compensation channel
16. Pressure compensation channel
17. Connecting plug
18. Hose
19. Free end
20. Temperature curve
21. Pressure curve
22. Point in time
23. Point in time

The invention claimed is:

1. An electrical power steering system for a motor vehicle, comprising:
   a steering housing of the electrical power steering system, in which a gear system is arranged, wherein a bar mounted such as to be displaceable longitudinally in the housing is a gear element for actuating steerable wheels, and wherein the steering housing is closed off by at least one folding bellows element, which is secured on one side to the steering housing and on the other side to the bar,
   an electric motor coupled to the steering housing, and
   a hose connected at one end such as to communicate with an interior volume of the steering housing and when in operation secured at a second free end in the motor vehicle above the steering housing, wherein said hose is configured to conduct air.

2. The power steering system according to claim 1, wherein the hose runs at least in sections parallel to electrical connecting leads of the power steering system.

3. The power steering system according to claim 2, wherein the hose is laid in a cable harness.

4. The power steering system according to claim 1, wherein the free end of the hose located away from the steering housing is arranged at the installation location of a battery of the motor vehicle.

5. The power steering system according to claim 1, wherein the steering housing and all areas communicating with it as part of the power steering system are completely sealed to the outside, except for the connection to the hose.

6. The power steering system according to claim 1, wherein the free end of the hose is provided with a U-shaped design.

7. The power steering system according to claim 1, wherein a cross-section of the free end of the hose is provided with a particle filter.

8. The power steering system according to claim 1, wherein the particle filter is a filter with a low flow restriction.

9. The power steering system according to claim 1, wherein the particle filter is manufactured from a non-woven fleece material.

10. The power steering system according to claim 1, wherein the hose is further configured to provide for air pressure compensation.

* * * * *